Figure 3A:
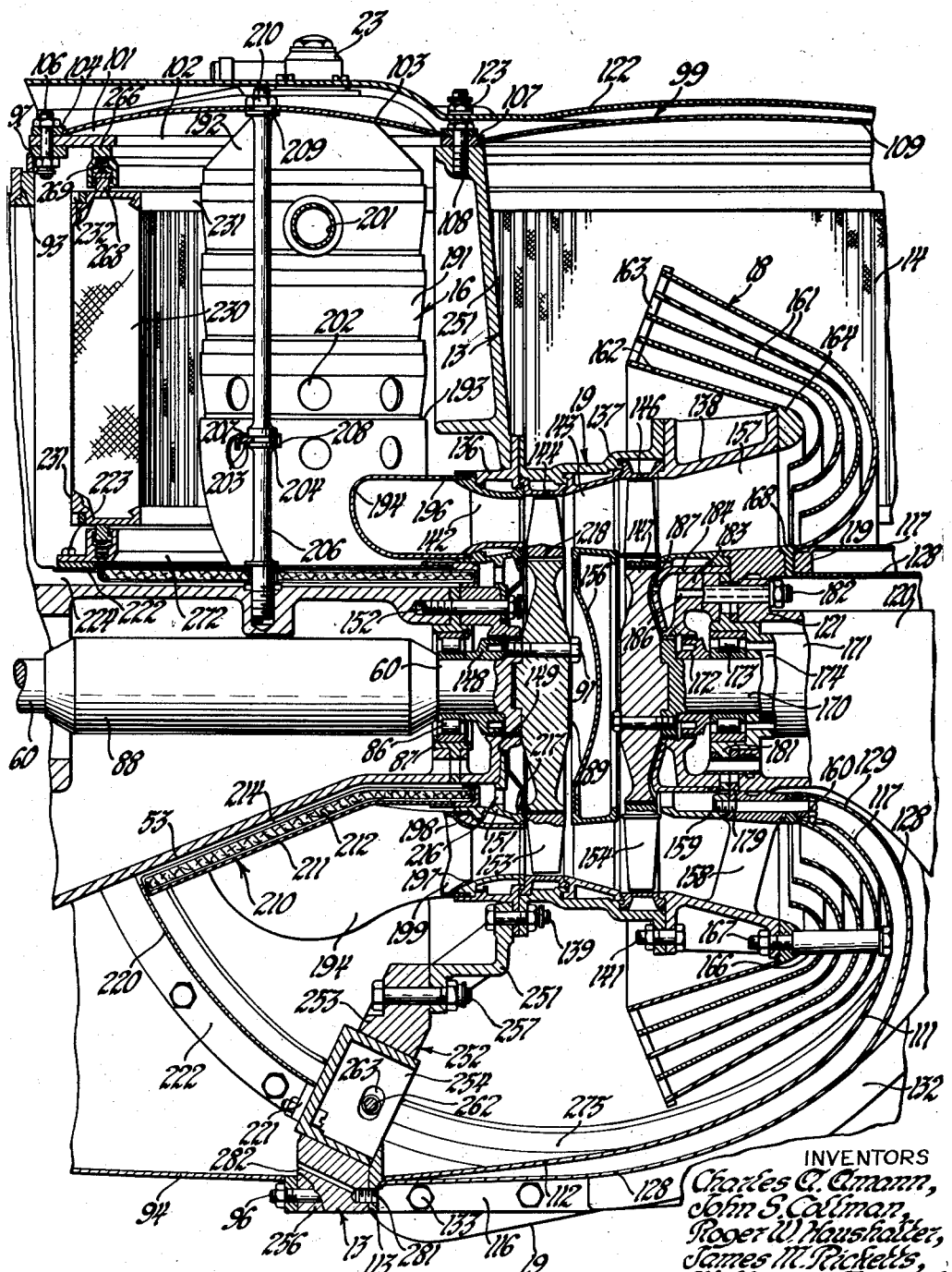

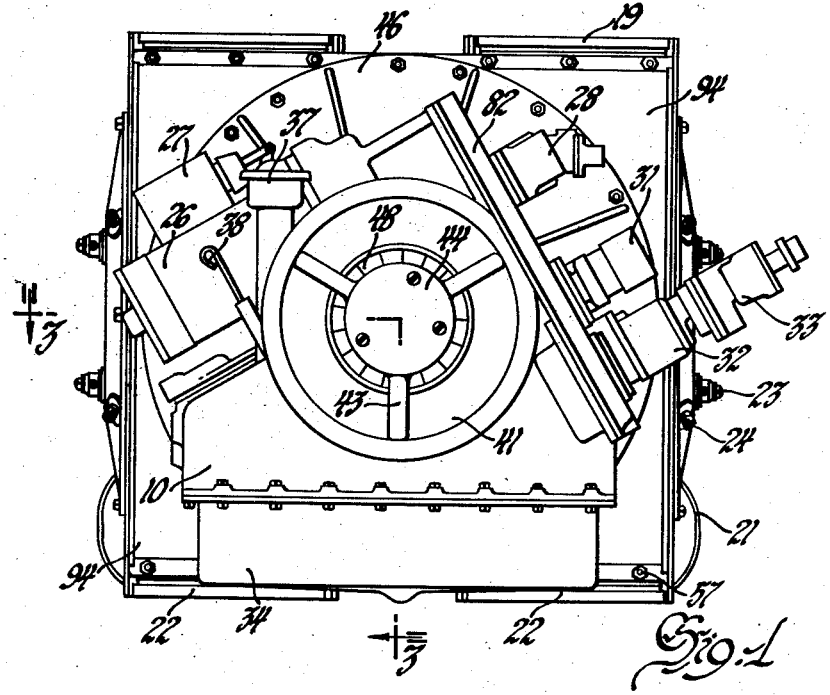

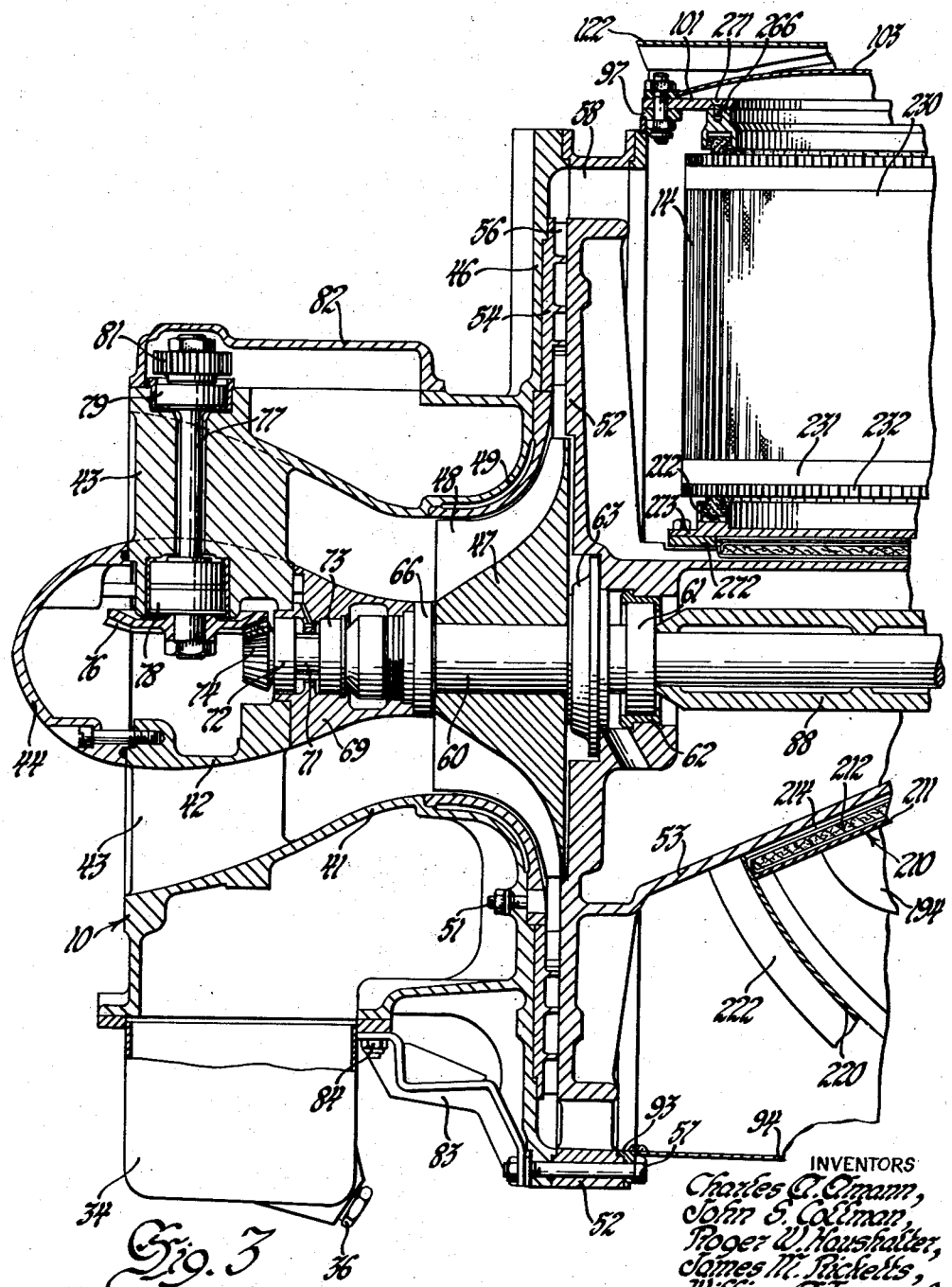

INVENTORS
Charles C. Amann,
John S. Collman,
Roger W. Haushalter,
James M. Ricketts,
William G. Turunen &
BY Paul T. Vickers Paul Fitzpatrick
ATTORNEY

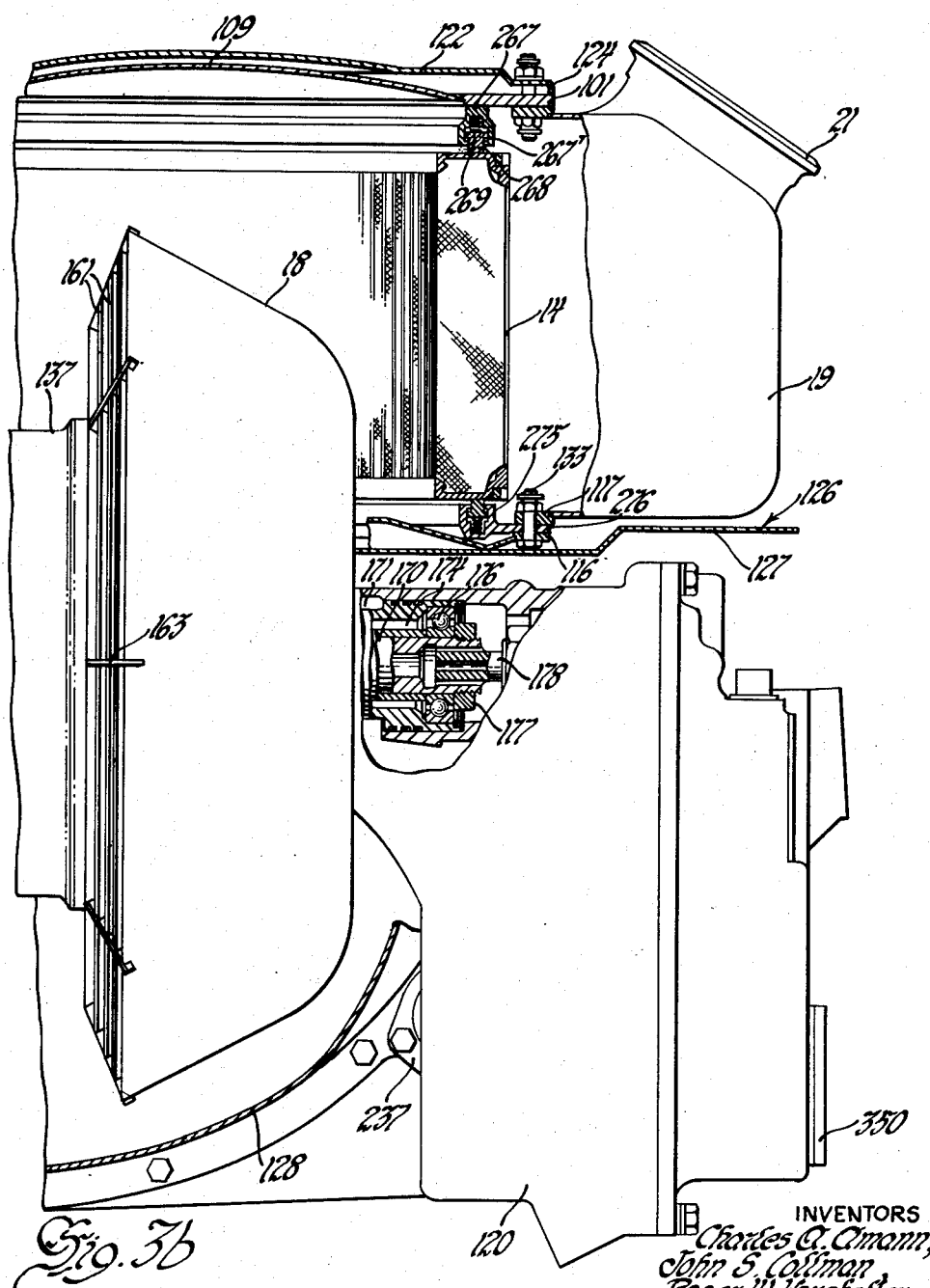

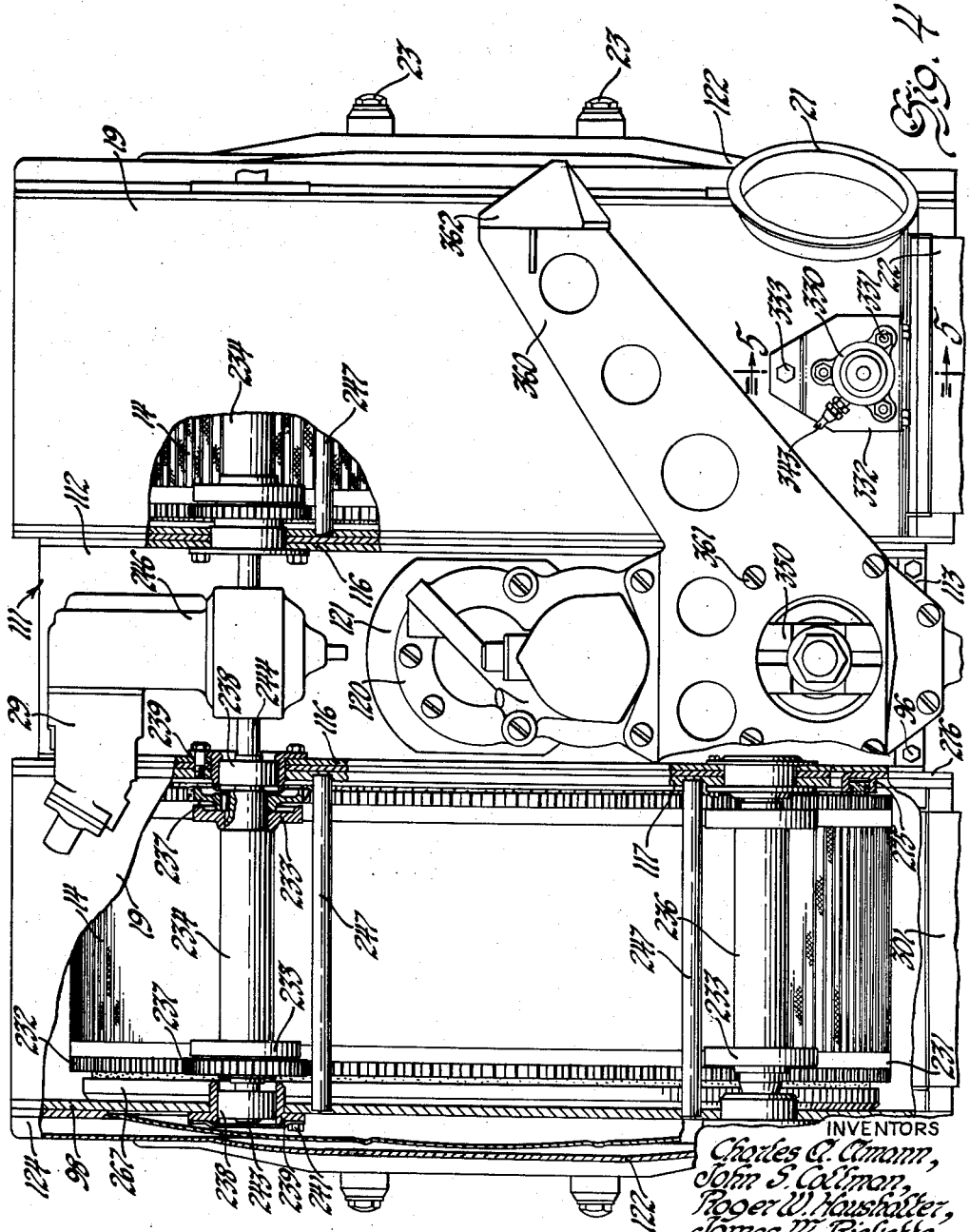

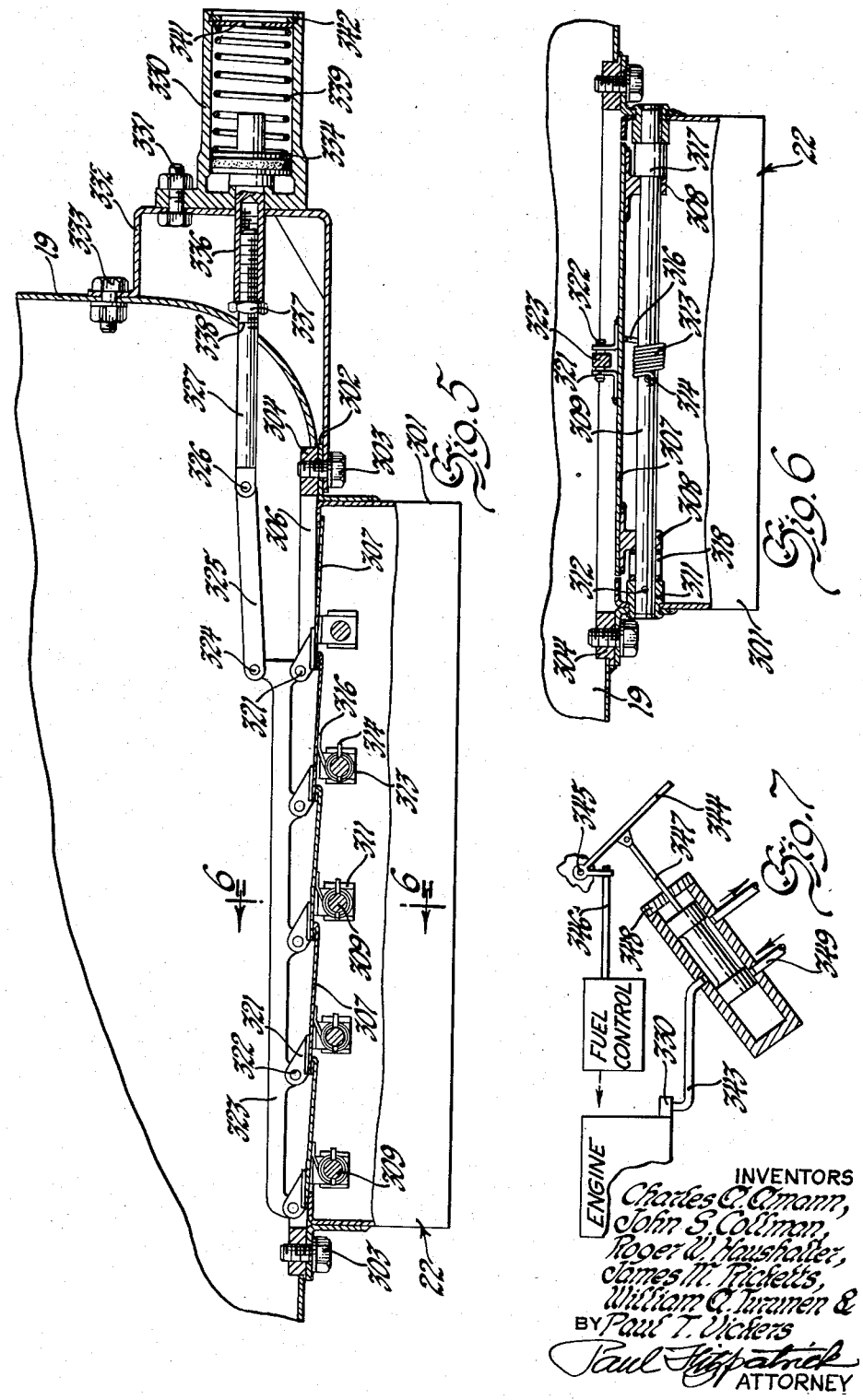

Jan. 7, 1964

C. A. AMANN ETAL 3,116,605

REGENERATIVE GAS TURBINE

Filed July 13, 1961

7 Sheets-Sheet 7

INVENTORS
Charles A. Amann,
John S. Collman,
Roger W. Haushalter,
James M. Ricketts,
William A. Turunen &
BY Paul T. Vickers Paul Fitzpatrick
ATTORNEY United States Patent Office 3,116,605
Patented Jan. 7, 1964

3,116,605
REGENERATIVE GAS TURBINE
Charles A. Amann, Birmingham, John S. Collman, Detroit, Roger W. Haushalter, St. Clair Shores, James M. Ricketts, Oxford, William A. Turunen, Birmingham, and Paul T. Vickers, Royal Oak, Mich., assignors to General Motors Corporation, Detroit, Mich., a corporation of Delaware
Filed July 13, 1961, Ser. No. 127,079
11 Claims. (Cl. 60—39.51)

This application is a continuation-in-part of our application Serial No. 559,475 filed January 16, 1956, now abandoned.

This invention relates to gas turbine engines and is particularly directed to the provision of a compact and efficient engine suitable for automotive power installations and the like.

The general nature of the invention may be understood from the following brief description of the preferred embodiment of the engine. The engine comprises a gas generator made up of a compressor, combustion apparatus, and a turbine driving the compressor. Associated with the compressor turbine is a power turbine driven by the combustion products. The engine is of a regenerative type with rotary regenerators which extract heat from the power turbine exhaust gas and transfer the heat to the air flowing from the compressor to the combustion apparatus to provide relatively high efficiency and a cool exhaust, both of which are highly desirable.

The engine is characterized by structural arrangements of the compressor, combustion apparatus, turbines, and regenerators which provide a very compact installation which is of suitable proportions for automotive installations and which, though light, is sufficiently strong and rigid for vehicular service. The structural organization is such that disassembly for inspection and servicing and assembly of the engine are facilitated. Among the factors contributing to compactness and accessibility are the arrangement of the regenerators so that they enclose the combustion apparatus and turbine and the mounting of the combustion chambers with their axes transverse to the turbine axis and parallel to the axis of the regenerator, by which the organization is made more compact and the combustion chambers made readily accessible.

Another feature of the engine lies in the utilization of a light weight sheet metal outer case and the bulkhead or diaphragm of the regenerators as primary structural elements of the engine. Another feature lies in improved structure for distributing the exhaust from the turbine uniformly to the regenerator matrices.

Another advantageous feature of the engine to accommodate it to passenger vehicles is the novel exhaust system. Because of the large quantity of air handled by a gas turbine the provision of adequate exhaust ducting in an automobile has been believed to be impracticable. In this engine two small exhausts are provided which can be connected to exhaust pipes leading to the rear of the car and which are adequate to handle the air flow when the engine is idling without excessive back pressure. In addition, larger exhaust openings from the engine directly to atmosphere under the car are provided which may be opened when substantial power is required from the engine.

Other important features of the engine are the subject of other patent applications to be referred to. Many other significant features of the engine will be apparent from the detailed description.

The principal objects of the invention are to provide an improved gas turbine engine, an improved regenerative gas turbine, a gas turbine of light weight and of compact and readily accessible structure, and a gas turbine particularly suited for automotive installations and the like.

Figure 8:
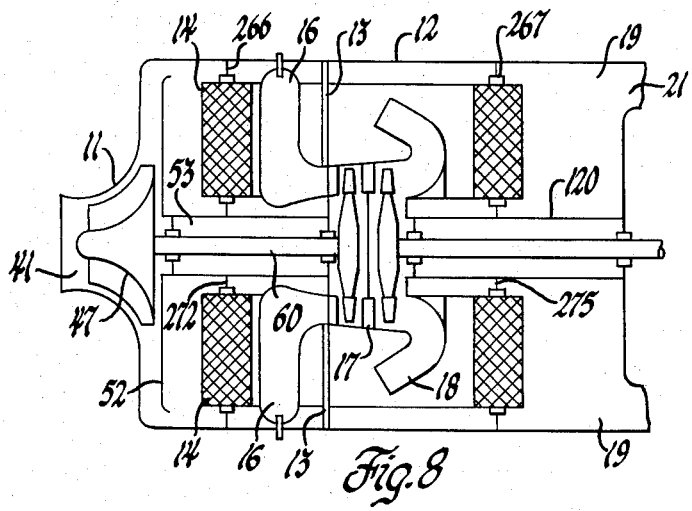
Figure 9:
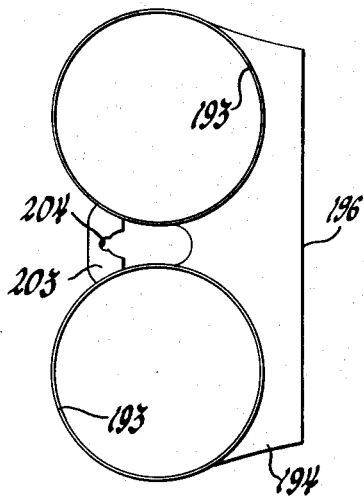
Figure 10:
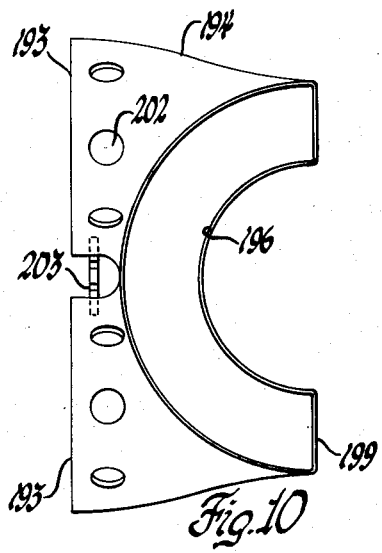

The nature of the invention and its advantages will be fully apparent from the succeeding detailed description of the preferred embodiment thereof and the accompanying drawings in which:

FIGURE 1 is a front elevation view of the engine.
FIGURE 2 is a side elevation with certain accessories removed and with parts cut away.
FIGURE 3 is a longitudinal sectional view of the front part of the engine, the lower part of the figure being a vertical section and the upper part a horizontal section.
FIGURE 3a is a view similar to FIGURE 3 of the central part of the engine.
FIGURE 3b is a view similar to FIGURE 3 of the rear part of the engine.
FIGURE 4 is a rear elevation view of the engine with parts cut away, as appearing from plane 4—4 in FIGURE 2.
FIGURE 5 is a partial view taken in vertical longitudinal section through a main exhaust.
FIGURE 6 is a sectional view of the same taken on the plane indicated by the line 6—6 in FIGURE 5.
FIGURE 7 is a schematic diagram of an exhaust control.
FIGURE 8 is a schematic horizontal sectional view of the engine.
FIGURE 9 is a side elevation view of a burner transition section.
FIGURE 10 is a rear elevation view of the burner transition section.

It will be noted that FIGURES 3, 3a, and 3b overlap slightly and that the three figures taken together illustrate the entire engine. These are essentially one figure which has been drawn on three sheets to provide adequate scale.

General Description

Referring first to FIGURES 1, 2, and 8 for a general description of the engine, the major parts are an accessory drive case 10, a compressor 11, an engine case or regenerator housing 12, a diaphragm or bulkhead 13 which divides the space within the regenerator housing into first and second chambers before and behind the bulkhead, a drum-shaped regenerator matrix 14 on each side of the engine, two combustion chambers 16 at each side of the engine, and a turbine 17. The turbine includes two independently rotating or gas-coupled turbine wheels, one of which drives the compressor which supplies compressed air through the regenerator matrices to the combustion chambers, from which motive fluid passes through the turbine. The other turbine wheel is coupled to a power output shaft. The turbine exhaust discharges through an annular diffuser 18 and flows through the regenerator matrices into exhaust collectors 19 at the rear of the engine at each side. An exhaust connection 21 is provided from each exhaust collector 19. Main exhaust outlets 22 are provided in the bottoms of the exhaust collectors 19.

Fuel is supplied to the combustion chambers 16 by fuel nozzles 23 and ignited by an igniter 24 for each chamber. The structure of these devices and the means for supplying fuel under control to the nozzles and energizing current to the igniters are not shown, since these are immaterial to the present invention.

Accessories

The accessory case 10 provides a mounting for engine accessories which are driven by the compressor turbine through gearing which may be conventional and is not shown, since it is immaterial to the invention. FIGURE 2 shows the accessory case without the accessories while FIGURE 1 shows them in position for identification. The accessories include a starter 26 which may be coupled to the engine by a solenoid 27. An oil pump 28 supplies oil under pressure to a hydraulic regenerator drive motor 29.

A tachometer generator 31 is coupled to a speed indicator (not shown). A fuel pump 32 and a governor 33 mounted one above the other are also driven by the gearing. An oil pan or sump 34 bolts to the bottom of the accessory case and is provided with a drain 36. Lubricating oil pumps (not shown) mounted in the accessory drive case draw oil from the sump for lubrication. Since the lubricating system is immaterial to the invention, a description thereof is omitted in the interest of conciseness. Oil may be supplied through a filler tube and breather pipe 37 and the level may be checked by a dip stick 38.

*Compressor*

Referring also to FIGURE 3, the accessory case 10 defines a converging annular air inlet 41 within which is a shaft housing 42 supported by three struts 43. A streamlined cap or fairing 44 is bolted to the front of the shaft housing.

The accessory case casting comprises a ribbed circular radial flange 46 at the rear thereof which defines the front case of a centrifugal compressor having a rotor 47 provided with vanes 48. An annular stationary shroud 49 for the compressor is mounted in the accessory case by bolts 51. The flange 46 provides a front case for the compressor diffuser, the rear wall of which is defined by the circular front flange 52 of an engine frame or gasifier shaft support identified generally as 53. A ring-shaped diffuser plate 54 bearing generally spiral vanes 56 is clamped between the plates 46 and 52, which are held together by a ring of bolts 57. The marginal portion of the flange 52 defines a ring of outlet passages from the diffuser between radial struts 58. The operation of the compressor requires no explanation, since it is merely an example of the known centrifugal type of compressor.

The compressor rotor 47 is mounted on a shaft 60 supported in a ball bearing 61 mounted in a cage 62 in an opening in the forward end of the frame 53. A compressor outlet labyrinth seal 63 is provided between the frame and the shaft and an inlet labyrinth seal 66 is provided between the shaft 60 and a shaft housing 69 fixed to the rear of the housing 42. The shaft housing 69 is externally streamlined and defines part of the inner wall of the air inlet.

*Accessory Drive*

A shaft 71 rotatably mounted in the cage 69 by ball bearings 72 and 73 is coupled to the forward end of shaft 60. A bevel gear 74 on the forward end of shaft 71 meshes with a bevel gear 76 driving an accessory drive shaft 77 extending radially within one of the struts 43. Shaft 77 is mounted in ball bearing 79 and gear 76 in bearings 78. Shaft 77 mounts at its outer end a gear 81 which is coupled through gearing (not shown) to the accessory devices 26, 28, 31, 32 and 33. A removable cover plate 82 provides access to the gearing.

FIGURE 3 also shows a mounting or support bracket 83 providing a forward support for the engine which is fixed to the accessory case 10 by nuts 84 on studs depending from the case and by some of bolts 57.

Referring to FIGURE 3a, the rear end of shaft 60 is mounted in a roller bearing 86 supported by a cage 87 bolted to the rear end of the engine frame 53. The shaft 60 is stiffened by a sleeve 88 which also serves as an abutment for the inner races of the bearings 61 and 86. It will be noted that the frame 53 provides a housing for the shaft which is generally elliptical in cross section at the forward end and circular at the rear end. A gasifier turbine wheel 89 piloted in the rear end of shaft 60 is secured by bolts 91. This turbine wheel drives the compressor and accessories.

*Regenerator Housing*

Considering now the outer case of the engine which serves as the regenerator housing, the outer margin of the flange 52 of the engine frame and compressor outlet casting bolts to the front flange 93 of a sheet metal front cover 94 which is circular in cross section at the foward end and rectangular at the rear end. The front cover has rear flanges at the top and bottom of the engine which are fixed to the top and bottom edges of the bulkhead 13 by bolts 96. The side bolting flange 97 of the front cover is arcuate, being disposed slightly outside the margin of the regenerator drums 14 to provide the forward edge of openings in the side of the engine through which the drums may be installed and removed. The rear part of the edge of this opening is defined by the outside bolting flanges 98 of the exhaust collectors 19 which provide the rear part of the regenerator housing. There is an exhaust collector at each side of the engine, as will be most clearly apparent from FIGURE 4. An approximately circular regenerator cover 99 is bolted onto the flanges 97 and 98. This cover comprises a plate 101 defining the margins of the cover and having two openings therethrough. The opening 102 in the forward part thereof is normally closed by a combustion chamber cover 103 which may be removed to provide access to the combustion chambers 16. The combustion chamber cover is of sheet metal welded to a stiffening strip 104 at the edges through which it is bolted in place. The forward edge of the combustion chamber cover together with the forward edge of the regenerator cover 99 are bolted to the flange 97 of the front cover by bolts 106. The central web 107 of the regenerator cover plate 101 underlies the rear edge of the combustion chamber cover. The rear edge of the combustion chamber cover 103 and the web 107 overlie the side edges of the bulkhead 13 to which they are fixed by nuts on studs 108. A light metal plate 109 welded to plate 101 closes the rear opening therein. The upper and lower edges of the combustion chamber cover bolt to studs (not shown) on the plate 101.

The rear of the engine housing between the exhaust collectors 19 is closed by a rear cover 111 which comprises a part cylindrical plate 112 which follows the outline of the regenerator drums from the lower edge of the bulkhead to the upper edge of the bulkhead. The forward edges of the rear cover and the exhaust collectors have stiffening flanges 113 which are secured to the edges of the bulkhead by the bolts 96. The side flanges 116 of the rear cover bolt to the inner side margins of the exhaust collectors which have bolting flanges 117.

Summarizing the engine housing, it will be seen that the front of the engine case or regenerator housing is defined by the rear flange 46 of the compressor, the front flange 52 of the engine frame, and the front cover 94. The sides of the housing are defined by the regenerator covers 99, the combustion chamber covers 103, and the outside faces of the exhaust collectors 19. The top, rear and bottom of the engine rearwardly of the bulkhead 13 is enclosed by the exhaust collectors 19 at each side and the rear cover 111 in the center. The central part of the rear cover 111 includes a funnel-shaped forwardly directed portion 118 which defines an opening parallel to the axis of shaft 60 and is terminated by a flange 119 which bolts to the outlet of the turbine.

A reduction gear case 120 which houses the reduction gears for the power output is mounted between the exhaust collectors and includes a portion which extends forwardly within the rear cover 111 and terminates in flange 121 which bolts to the turbine outlet casting.

A radiation shield 122 which is generally co-extensive with the regenerator cover and spaced outwardly therefrom is mounted on each side of the engine. This is a light sheet metal plate which is secured, as for example, by nuts 123 shown in FIGURE 3a, onto some of the studs which secure the regenerator cover. The rear edge of the shield has an inwardly turned flange 124 which bears against the rear margin of the regenerator cover. The fuel nozzles and igniter plugs extend through openings in this shield.

A rear radiation shield 126 is provided to reduce radiation of heat from the exhaust collectors and rear turbine cover to the reduction gear. This shield comprises side plates 127 which lie parallel to and spaced from the inside walls of the exhaust collectors and a central portion 128 which is of similar form to the rear turbine cover 111 and includes a funnel-shaped portion 129 which pilots inside the flange 119 of the rear turbine cover. The upper and lower edges of the central part 128 of the heat shield, which extends between the side plates 127, terminate in outwardly bent flanges which are held under the heads of bolts 96.

A flange 132 extending from shield 126 is secured by some of the bolts 133 which bolt the rear turbine case to the exhaust collectors. This shield is omitted from FIGURE 4.

It has already been pointed out that the engine frame 53 supports the compressor turbine and compressor rotors and is bolted to the flange 46 of the compressor case. The front cover 94, regenerator cover 99, and combustion chamber cover 103 connect the flange 52 to the top, bottom and side edges of the bulkhead 13, thereby locating and supporting this bulkhead with respect to the compressor turbine and compressor. These parts constitute an outer frame of the engine which is connected through the stator of the turbine to the inner frame 53.

Turbine

The present application is not directed to the structure of the turbine as such, which is the subject matter of application Serial No. 559,176, Turbine, filed January 16, 1956 (Patent No. 2,960,306). However, the turbine is described below sufficiently for an understanding of the engine. Turbine 17 (FIG. 3a) includes an outer case or stator comprising from front to rear a compressor turbine outer shroud support 136, a main turbine case 137, and a turbine exhaust duct casting 138. These three parts have flanges bolted together to provide a rigid case. The shroud support 136 extends through an opening in the bulkhead 13 and has a flange. This flange and the front flange of the main case 137 are secured to the bulkhead by bolts 139. The main case and exhaust duct have mating flanges coupled by bolts 141. The compressor turbine nozzle diaphragm 142 and the power turbine nozzle diaphragm 143 are mounted in the case, as well as the outer shroud ring 144 for the compressor turbine wheel 89 and an outer shroud ring 146 for the power turbine wheel 147. The compressor turbine wheel 89, as previously stated, is bolted to the shaft 60 which connects it to the compressor. A labyrinth seal comprising an inner ring 148 on the shaft and an outer stationary ring 149 is provided between the turbine wheel and the bearing. The cage 87 for bearing 86, the outer seal ring 149, and an inner turbine nozzle shroud support 151 are fixed to the rear end of the turbine inner frame 53 by studs 152. It will be seen, therefore, that the compressor turbine nozzle 142 is supported by the outer support 136 mounted in the bulkhead 13 and the inner support 151 mounted on the frame 53.

The nozzle 142 is fixed axially relative to the inner support 151, but is free to slide axially of the turbine to a limited extent in the outer support 136. Therefore, the nozzle is slidably supported by the bulkhead and the bulkhead may shift axially relative to the frame 53.

The nozzle 142 directs the motive fluid onto the blades 153 of the compressor turbine which discharges them into power turbine nozzle 143 from which they flow to blades 154 on the power turbine wheel 147. A diaphragm or disk 156 is mounted in the center of the nozzle 143.

The power turbine 147 discharges into the exhaust passage 157 extending through the exhaust casting 138, which is crossed by struts 158 which support the inner wall of the exhaust duct. The forward portion of the inner wall of the exhaust duct is defined by a ring 159 which receives the threaded end of bolts 160 which also secure the flange 119 of the rear turbine cover to the turbine.

The turbine exhausts into the annular diffuser 18 which serves to diffuse the turbine exhaust and distribute it throughout the chamber between the bulkhead 13 and the regenerator matrix 14, thus preventing an undue concentration of flow through the matrix in the immediate region of the exhaust duct 138. This diffuser is made up of a number of recurved annular metal sheets 161 and a conical inner sheet 162 which are fixed together at their outer forward edges by radial struts 163 to which they may be welded. The rear end of sheet 162 is welded to a ring 164 from which extend a number of tubes 166 to which the other sheets are welded. Bolts 167 passing through the tubes 166 and ring 164 fixes the diffuser on the rear outer flange of the exhaust duct 138. The outermost sheet 161 is welded at its inner edge to a flange 168 which is held between the flange 119 and the inner wall of the exhaust duct.

The power turbine wheel 147 is bolted to a power output shaft 170 which is supported in a cylindrical cartridge 171 (FIGS. 3a and 3b) in the reduction gear case 120. The cartridge arrangement permits easy installation of the power turbine. An inner ring 172 of a labyrinth seal, the inner race of a roller bearing 173, a sleeve 174, and the inner race of a ball bearing 176 are held on the shaft in that order by a nut 177. The power input shaft 178 of the reduction gear splines into rear end of shaft 170. The flange 121 on the front end of the reduction gear case, a flange 179 extending from the inner wall of the exhaust duct, and a flange 181 on the forward end of the cartridge are held in assembled relation by studs 182 which are threaded into the outer ring 183 of the labyrinth seal. It will be noted that these parts have piloting surfaces and abutting flanges to insure proper alignment.

A heat shield 184 is disposed between the seal ring 183 and the portion 159 of the exhaust duct and the face of the turbine wheel 147. Cooling air is supplied from the compressor through a pipe (not shown) which connects to a passage 186 through the flanges 121, 179, and 181 and the outer wall of the seal ring 183. This air is discharged into the space between the seal ring and heat shield 184, and flows through twelve small holes 187 in the heat shield. This air cools the turbine wheel 147 and displaces hot motive fluid away from the labyrinth seal. It also cools the seal and thus bearing 173, and keeps the motive fluid away from the labyrinth seal so it cannot flow through the seal onto the bearing.

Combustion Apparatus

Referring now to the combustion apparatus shown in FIGURES 2 and 3a, there are two horizontal combustion chambers 16 on each side through which gas flows inwardly toward the center of the engine. The combustion chambers are of known type comprising a number of rings 191 joined together by corrugated spacing strips. The entrance end of the combustion chambers is partly closed by a dome 192 which pilots on the fuel nozzle 23 in known manner. The inner or discharge end of each combustion chamber fits slidably into one of two entrances 193 of a burner transition section 194 (see also FIGS. 9 and 10). One of these transition sections is provided at each side of the engine. They are of such form as to conduct the flow from the two adjacent entrances 193 into a semi-annular discharge section 196 which pilots over the exterior surfaces of the first turbine nozzle shrouds 197 and 198. As will be apparent, therefore, the two discharge sections cover the entire area of the turbine nozzle. The end walls 199 of the semi-annular sections are notched at the inner and outer margins to receive the edges of the turbine nozzles. The ignition plugs 24 (FIG. 2) enter the combustion chamber dome obliquely and serve to locate the chamber axially of its own length. Openings are provided in the walls of the chamber for crossover sleeves 201.

Dilution air openings 202 are provided in the last ring of the combustion chamber and in the entrance portions of the transition sections. A tie strap 203 extends between the entrance portions 193 of the transition section 194 to locate it against displacement from the turbine nozzle. The strap 203 is welded to the transition section and has a notch 204 which is received between abutments on a tie bolt 206, the inner end of which is threaded into a boss in the wall of frame 53. The engagement of the strap between the shoulders prevents radially outward movement of the transition section. A clip 207 which fits over the bolt and has flanges 208 which fit over the strap prevents forward or rearward displacement of the strap. The clip may be wired to the strap when the engine is assembled. The tie bolt 206 also serves to reinforce the combustion chamber cover 103 against gas pressure. The outer end of the tie bolt passes through a hole 209 in the combustion chamber cover and mounts a nut 210 which bears inwardly on the central part of the cover. The combustion chambers may be removed by unbolting the cover 103 and sliding them out from the transition section by pulling the cover outwardly.

As will be apparent, the combustion chambers receive air which has been discharged through the compressor outlet between struts 58 and has been heated by flowing through the regenerator matrix 14. Fuel injected by the nozzles 23 and initially ignited by the spark plugs 24 burns in the chambers, the combustion gases being diluted by air entering at holes 202, and flowing through the outlet portion 196 of the transition section into the compressor turbine and on through the power turbine. The turbine exhaust, after deflection by the diffuser 18, flows outwardly through the rear part of the matrix into the exhaust collectors 19 and to the exhausts 21 and 22.

*Compressor Turbine Cooling*

The compressor turbine shaft housing 53 is shielded from the heat of the hot air around the combustion chambers and the radiation from the combustion chambers by a heat shield (FIGS. 3 and 3a) indicated generally as 210 which comprises a metal sleeve 211 and a blanket of heat insulating material 212 within the sleeve. All will be apparent, these parts conform in shape to the shaft support 53 and are spaced slightly therefrom to provide a narrow annular air passage 214 between the heat shield and the support.

Compressor discharge air may enter the forward end of the passage 214 before passing through the regenerator matrix and flows rearwardly through the passage to the turbine. This cooling air flows through a ring of holes 216 in the turbine inner shroud support and through holes 217 in the rear flange of the shroud support against the rim of the compressor turbine wheel. The air may flow through the space between the shroud and the wheel and also through the bases of the blade slots 218 beneath the blades, thus providing some cooling for the rim of the turbine wheel.

The forward end of sleeve 211 is welded to a plate 220 which is approximately a third of the circumference of a cylinder in configuration. Plate 220 serves to provide a wall which closes the gap between the two regenerator drums 14 which otherwise would permit air discharged from the compressor to flow directly into the combustion chamber without passing through the matrix. The wall 220 has a central opening through which the frame or shaft housing 53 passes which admits air to the passage 214. The upper and lower ends of the wall 220 are provided with flanges 221 which are bolted to the regenerator bulkhead 13. This wall also has side flanges 222 which project from the circumference of the wall and are fixed by studs 223 to bosses 224 on the side of the frame 53.

*Regenerator*

Since the regenerator as such is the subject of application Serial No. 559,390, Rotary Regenerator, filed January 16, 1956 (Patent No. 3,057,604), and the regenerator matrix preferably is of the type disclosed and claimed in application Serial No. 559,389, Regenerative Heat Exchanger, filed January 16, 1956 (Patent No. 2,937,010), it is unnecessary to describe these structures in detail. However, the following description is sufficient to understand the regenerator in its relation to the rest of the engine.

Referring to FIGURE 3a, each regenerator matrix 14 comprises porous heat exchange material 230 mounted between end rings 231 to which the sheets of heat exchange material 230 are interlocked. A ring gear 232 is fixed on each of the end rings. The matrix provides a rigid structure with the faces of the rings 231 defining a smooth continuous edge for the matrix and the peripheries of the rings providing a surface which may be supported and guided by rollers.

Referring to FIGURE 4, the view is cut away to show a rear elevation of one matrix. The rims 231 bear against four rollers 233 mounted on an upper shaft 234 and a lower shaft 236. Shaft 234 also bears two matrix driving gears 237 keyed to the shaft. Shaft 234 is rotatably supported in roller bearings 238 at each end mounted in cages 239 secured by cap screws 241 to ears or extentions 242 (FIG. 2) of the inner side flanges 93 of each exhaust collector 19. A cover plate 243 is mounted over the bearing and the end of the shaft. The inner end portion 244 of each shaft 234 extends into a small reduction gear and drive case 246 on which is mounted the hydraulic drive motor 29. The interior structure of the reduction gear 246 is immaterial. It merely serves to drive the shafts 234 at reduced speed from the driving motor 29 supplied with oil under pressure from the pump 28 on the accessory case through piping not shown. The exact means driving the regenerator drums is immaterial. They preferably are driven at about 10 to 60 r.p.m.

Shaft 236 is mounted similarly to shaft 234. This is an idler or support shaft and, therefore, does not mount driving gears. As will be apparent from FIG. 4, the shafts 234 and 236 are disposed to support the regenerator drum against a rearward thrust which is exerted on the drum by the gas when the engine is in operation. The rollers 233 provide support and location for the drum in operation, and the drum is otherwise free for expansion relative to the housing.

FIGURE 4 also shows tie rods 247 connecting side walls of the exhaust collectors.

Proceeding to the regenerator diaphragm or bulkhead 13 (FIGS. 2 and 3a), it will be recalled that this bulkhead is connected at the top, bottom, and sides to the outer case or regenerator housing and has a central opening through which the turbine case extends, the case being bolted to the bulkhead. The bulkhead comprises a central plate 251 which is ribbed for strength and which extends from side to side of the engine and slightly above and below the turbine case. Above and below the main plate are two seal bar assemblies 252 which extend from side to side of the engine and from the upper and lower margins of the main plate to the top and bottom of the housing. Each seal bar assembly comprises an inner seal bar 253, a central block 254, and an outer seal bar 256, these being bolted together in a rigid assembly. The inner seal bars 253 are fixed to the top and bottom edges of the main plate 251 by bolts 257 and the outer seal bar 256 provides the margin of the bulkhead to which the front cover 94, rear turbine case 111, and exhaust collectors 19 are secured by bolts 96. The central block 254 closes the space between the two regenerator drums, the drums extending through the bulkhead on each side between the seal bars 253 and 256. The upper and lower ends of the wall 220 between the drums at the front are fixed to the block 254 as previously described. The outside ends of the seal bars are connected by end caps 258 which may be removed to permit installation or removal of the regenerator drum 14. As will be apparent, an opening through which the drum 14 passes is defined by the seal bars 253 and 256, the central block 254, and the end caps 258.

Four main seals 260 are mounted in these openings to seal against the regenerator drum and thus prevent flow of fluid from the high pressure or compressor discharge side ahead of the bulkhead to the low pressure or turbine exhaust side behind the bulkhead. The main seals are mounted so as to permit movement radially with respect to the drum and oscillation about an axis parallel to the axis of the drum so that the seals can align themselves properly with the drum. This construction provides for differential expansion or warping of the parts. The structure of the main seals is not described herein since it is described in detail in the aforementioned application Serial No. 559,390, and the details of these seals are not essential to an understanding of the engine. It may be noted, however, that each main seal 260 has mounted thereon rollers 261 which ride on the rim 231 of the matrix and that the main seals have trunnions 262 extending from them which can move radially to a limited extent in slots 263 in the central block and 264 in the end caps. The matrix, with the main seal assemblies, may be installed or removed by removing the cover plates and lifting off the end caps 258.

Rims seals engaging the edges of the matrix are necessary to prevent by-passing. There are provided, therefore, four rings of contact seals, engaging each edge of both drums. Each ring, for structural reasons, comprises a forward arc ahead of the diaphragm and a rear arc behind the diapragm. The outer rim seals (FIGS. 3, 3a, 3b, and 4) comprise a front support 266 ahead of the diaphragm and a rear support 267 behind the diaphragm, these being arcuate channel members with an undercut or recessed groove 267' in the inner face within which are mounted flanged sealing segments 268 of graphite or a similar material. The graphite segments are urged against the edge of the matrix by small coil springs 269 mounted in pockets in the supports 266 and 267. The supports are mounted on the plate 101 of the regenerator cover by screws 271. These rim seals bear against the edge of the matrix except where it passes through the main seal 260. The inner rim seal is substantially identical to the outer rim seal and is shown on the same figures. The difference lies in the supporting structure for the seal. The front inner rim seal support 272 (FIGURE 3) is integral with a flange 273 which is bolted to the side flange 222 of the wall 220. The rear inner rim seal support 275 (FIGURES 3b and 4) is integral with a flange 276 which is co-extensive with the inner flange 117 of the exhaust collector 19 and bolts between that flange and the side flange of the turbine exhaust case. As shown most clearly in FIGURE 3b, bolts 133 pass through the flange 116 of the rear turbine case and flange 117 of the exhaust collector.

To recapitulate, it will be apparent that the wall 220, block 254, rear turbine case 111, and the inner rim seals define a wall or enclosure extending between the inner or adjacent edges of the matrices. The outer case or housing with the outer rim seals prevents gas flow past the outer edges of the matrices. The bulkhead assembly 13 divides the space within the matrices into a forward and a rear chamber and prevents flow between these, except for incidental leakage and a small amount of gas carried through the seal by the matrix. Thus, from a functional standpoint, the regenerator provides four spaces. The first is a cool gas space ahead of the matrix, supplied with air by the compressor. This air is constrained by the seals to flow through the matrix into a second or hot air space between the forward part of the matrix and the bulkhead, within which the combustion chambers 16 are mounted. This air, after heating in the combustion chambers, flows through the turbine into a third or hot gas space between the bulkhead and the rear part of the matrix. The rim seals force this hot turbine exhaust gas to flow outwardly through the matrix into the exhaust collectors, which define a fourth or cool gas space. The hot gas flowing through the matrix heats the matrix which is rotated slowly by the hydraulic motor 29 and gives up heat to the air flowing from the first to the second space.

The gas pressure on the matrix when the engine is operating presses the matrix against the support rollers 233 at the rear of the engine, so that these support the matrix.

The connection to supply air from the compressor to the power turbine for cooling is provided in the lower outer seal bar 256. A tapped opening 281 in the rear face of the seal bar is disposed between two of bolts 96. Two small passages 282 drilled through the bar connect opening 281 to the space ahead of the seal bar, which contains compressor discharge air. Opening in flange 113 and the flange of heat shield portion 128 permits connection of a pipe (not shown) running to the cooling air inlet 186 of the power turbine.

*Exhaust System*

It is not feasible in an automobile of usual configuration to provide ducting of sufficient capacity to carry the exhaust to the rear of the car. However, it is undesirable to vent the engine exhaust at the front of the car under all conditions. A feature of the engine is that there is an exhaust system similar to that employed with reciprocating engines for disposing of the exhaust under idling conditions when the vehicle is stationary and, in addition, a main exhaust at the engine which is opened only when the engine is generating power, which implies that the vehicle is moving and, therefore, there will be sufficient movement of air under the vehicle to carry the exhaust away.

Referring to FIGS. 4, 5, and 6, an idling exhaust outlet 21 is provided from each exhaust collector which may be connected to an exhaust pipe (not shown) running to the rear of the vehicle, as usual, which may be of such dimensions that it may be installed in a vehicle of generally conventional structure. The area of this is sufficient to carry the exhaust gases without excessive back pressure under relatively low volume conditions which obtain when the engine is idling. A main exhaust 22 of much larger area is provided in the bottom of each exhaust collector. A short rectangular shield or box 301 open at both ends has a flange 302 at the top which is fixed by bolts 303 to a bolting flange 304 welded in the bottom of the exhaust collector 19 and defining an exhaust opening 306. This opening is closed under idling conditions by a number of overlapping louvers 307 which are welded to lugs 308, rotatable on rods 309 mounted in bosses 311 in the side walls of the box 301 and held against rotation by pins 312. The louvers are urged toward closed position by coil torsion springs 313, one end 314 of which is hooked over a pin passed through a hole in the rod 309, and the other end 316 of which bears against the under surface of the louver plate 307. A spacing sleeve 317 is mounted between the lugs 308 and one of the bosses 311. A C-shaped spring 318 having holes through which the rod 309 passes is mounted between the other lug 308 and boss 311. This spring urges the louver to the right as viewed in FIGURE 6 against the sleeve 317.

Each louver plate has welded thereto two arms 321 for actuation of the louvers. These arms are coupled by pins 322 to an actuating rod 323. The actuating rod is coupled by pin 324, link 325, and pin 326 to a pull rod 327 which may be actuated to open the louvers.

Actuating rod 327 is coupled to a small hydraulic cylinder 330 having ears secured by bolts 331 to a mounting bracket 332 fixed to the wall of the exhaust collector 19 by a bolt 333 and some of cap screws 303. A piston 334 in the cylinder is integral with a rod 336 into the end of which the pull rod 327 is threaded. A jam nut 337 fixes the adjustment of the pull rod in the piston rod. The pull rod passes through a small hole 338 in the wall of the exhaust collector. The piston is urged to the left as viewed in FIG. 5 by coil springs 339 engaging the piston and a spring retainer and piston stop plate 341 which is held in place by a snap ring 342. Oil or other motive fluid under pressure may be admitted to the left face of the piston through a pressure fluid connection 343 (FIGURE 4).

The cylinders 330 are supplied with fluid to open the exhausts 22 when the power setting of the engine is advanced above idling. While numerous arrangements may be adopted for this purpose, a simple and feasible one is illustrated schematically in FIG. 7. A foot throttle 344 swingably mounted on a pivot 345 is coupled through push rod 346 to a fuel control which determines the engine power output. Foot throttle 344 is also coupled through rod 347 to the movable member of a standard spool valve 348 which couples the supply conduit 343 to the cylinders 330 to a source of actuating oil such as hydraulic pump 28 and to a fluid return line. The supply and return lines to the valve are indicated by the arrows. When the throttle is in idling position, the cylinders 330 are vented. When the throttle is depressed, the vent line is closed and the pressure line 349 is connected through line 343 to the cylinders.

Preferably, the strength of springs 313 and 339 is such relative to the area of the louver plates 307 that even with the cylinders vented, any significant gas pressure will hold the louvers open. Thus, if the throttle is closed, the louvers will remain open and prevent excessive back pressure until the engine has decelerated to idling speed and gas flow conditions.

It would be possible, of course, to dispense with the cylinders 330 and depend solely upon the gas pressure in the exhaust collector 19 to open the louvers, but this would result in some undesirable back pressure under normal running conditions. The exhaust system described above is the subject of our application Serial No. 3,556, filed January 20, 1960 (Patent No. 3,095,700).

Any suitable exhaust ducting extending to the rear of the car may be connected to the outlets 21. Application Serial No. 482,731, filed January 19, 1955 (Patent No. 2,875,841), shows dual exhaust ducts which might be used with this engine.

Reduction Gear

As previously described, the reduction gear 120 is fixed to the turbine case and mounts the cartridge 171 which houses the power turbine shaft 170. This shaft is coupled to the input shaft 178 of reduction gearing in the housing which reduces the rather high turbine rotation speed to a speed suitable for drive of the automobile propeller shaft so that additional reduction gearing is not necessary for normal high gear operation of the car, except such as ordinarily is provided in an automobile rear axle. The gearing within the reduction gear is not described, since it may be of conventional type. The power takeoff is through a drive shaft connection 350 at the lower rear of the reduction gear. It will be seen that the reduction gear also serves to lower the automobile drive shaft so that the floor of the vehicle may be lower.

The rear support or mount of the engine is carried through the reduction gear. A beam 360 fixed to the rear face of the reduction gear case by four bolts 361 extends outwardly and upwardly to pads 362 at each side which may be suitably supported on the automobile frame. These two supports, with the support 83 at the compressor, provide a three-point mounting for the engine. Beam 360 is omitted from FIG. 3b.

The engine may thus be mounted in the engine compartment of an automobile of usual type, with the air intake at the front of the car and the power output 350 in location to be connected to a shaft leading to a transmission (not shown), preferably at the rear axle.

The operation of the engine will be clear to those skilled in the art from the foregoing description without a review thereof, which is omitted in the interest of conciseness.

It will be apparent that the structure described is particularly adapted to the intended end of providing a light, compact, efficient, and easily accessible power plant particularly suitable for automobiles.

Enlarging upon the advantages of our engine, it will be apparent that the arrangement of the major units of the engine (compressor, combustion apparatus, turbines, and regenerators) as shown provides an exceptionally compact engine with a minimum of ducting and minimized external dimensions and area.

Operating experience with engines as described herein and engines having the same disposition of the major units has demonstrated important advantages for our compact symmetrical engine.

The high pressure containment plenum chamber and the low pressure exhaust plenum are symmetrical about two axes. This symmetry is an important factor in providing structural integrity to withstand the pressure forces within the engine structure and to accommodate the thermal growth of hot engine parts without deleterious distortion of main engine axes. This greatly simplifies the problem of maintaining satisfactorily close clearance on the engine turbines and regenerator seals.

Another advantage directly associated with the two drum arrangement is the almost complete containment of the hot engine parts (turbines and combustors) within the regenerator drums which are hot on the inside and relatively cool on the outside. This arrangement protects the compressor assembly from undesirable thermal effects and greatly reduces the need for thermal shielding on all of the outer surfaces of the engine except the side covers within the circle defined by the regenerator drums.

The regenerator drums act as an exhaust silencer and as a noise containment shield around much of the engine in the same manner as they act as heat containment shields. The heat containment is associated with their direct function in the cycle; the sound containment is an incidental advantage.

It will be appreciated that these important advantages follow primarily from the disposition of the two regenerator drums symmetrically at each side of the turbine axis and largely enclosing the turbine.

The detailed description of the preferred embodiment of the invention for the purpose of explaining the principles thereof is not to be construed as limiting or restricting the invention, as many modifications may be made by the exercise of skill in the art within the scope of the invention.

We claim:

1. A gas turbine engine comprising, in combination, a housing, a turbine including an annular case providing a gas inlet and an annular gas outlet, a regenerator including two regenerator drums each encircling part of the case and rotatable about an axis substantially intersecting perpendicularly the axis of the turbine case, the drums being disposed equidistantly at each side of the axis of the case and the distance between the drums being substantially less than the diameter of the case, and a regenerator bulkhead extending from the turbine case to the housing, the turbine discharging into a space between the bulkhead and the drums, and the housing enclosing the regenerator.

2. A gas turbine engine comprising, in combination, a turbine, a radial-flow compressor driven thereby having an outlet diffuser, the compressor and turbine having a common axis, combustion chambers connected to the turbine to deliver motive fluid thereto, a regenerator comprising two rotary regenerator matrices of a radial-flow type rotatable about an axis transverse to the turbine axis, the matrices being symmetrically disposed at each side of the turbine axis and the regenerator having approximately the same dimensions transverse to the turbine axis as the compressor diffuser, a housing for the matrices, a bulkhead dividing the housing into a compressed air section connected to the compressor diffuser and an exhaust gas section connected to the turbine exhaust, the combustion chambers being disposed in the compressed air section, the regenerator matrices extending through the bulkhead and being disposed directly between the compressor diffuser and the combustion chambers.

3. A gas turbine engine comprising, in combination, a compressor including a rotor and a case, a turbine including a rotor and a case, the rotors being coaxial, a support member extending from the compressor case, a shaft coupling the rotors, a housing mounted on the compressor case and surrounding the support member, a bulkhead member mounted on the housing and extending to the turbine case, the turbine case being rigidly connected to said bulkhead member, a nozzle for the turbine connected to said members, combustion apparatus mounted in said housing in the air flow path from the compressor to the turbine nozzle and two similar radial-flow regenerator drums rotatable about an axis transverse to the compressor-turbine axis and disposed symmetrically on opposite sides of the compressor-turbine axis, the drums passing through the bulkhead member and having part thereof located directly spatially between the compressor and combustion apparatus, the combustion apparatus being located directly between the drums and the bulkhead within the drum, the distance between the regenerator drums being less than the diameter of the turbine case.

4. A gas turbine engine comprising, in combination, a compressor including a rotor and a case, a turbine including a rotor and a case, the rotors being coaxial, a support member extending from the compressor case, a shaft coupling the rotors rotatably mounted in the support member, a housing mounted on the compressor case and surrounding the support member, a bulkhead member mounted on the housing and extending to the turbine case, the turbine case being rigidly connected to said bulkhead member, combustion apparatus mounted in said housing in the air flow path from the compressor to the turbine nozzle, and a radial-flow regenerator drum at each side of the turbine rotatable about an axis transverse to the compressor-turbine axis, the drums being substantially identical and being symmetrically disposed with respect to the compressor-turbine axis, the drums encircling and partially enclosing the turbine.

5. A gas turbine engine comprising, in combination, a compressor including a rotor and a case, a turbine including a rotor and a case, the rotors being coaxial, a support member extending from the compressor case, a shaft coupling the rotors rotatably mounted in the support member, a housing mounted on the compressor case and surrounding the support member, a bulkhead member mounted on the housing and extending to the turbine case, the turbine case being rigidly connected to said bulkhead member, a nozzle for the turbine rigidly connected to one of said members and slidably supported by the other of said members for relative movement in the direction of the rotor axis, combustion apparatus mounted in said housing having an axis parallel to the regenerator axis and connected for air flow to the compressor and turbine, and a radial-flow regenerator drum rotatable about an axis transverse to the compressor-turbine axis, the drum passing through the bulkhead member and having part thereof located directly between the compressor and combustion apparatus, the combustion apparatus being located directly between the drum and the bulkhead within the drum.

6. A gas turbine engine comprising, in combination, a compressor including a rotor and a case, a turbine including a rotor and a case, the rotors being coaxial, a support member extending from the compressor case, a shaft coupling the rotors rotatably mounted in the support member, a housing mounted on the compressor case and surrounding the support member, a bulkhead member mounted on the housing and extending to the turbine case, the turbine case being rigidly connected to said bulkhead member, a nozzle for the turbine rigidly connected to one of said members and slidably supported by the other of said members for relative movement in the direction of the rotor axis, combustion apparatus mounted in said housing having an axis parallel to the regenerator axis and connected for air flow to the compressor and turbine, and a radial-flow regenerator drum at each side of the turbine rotatable about an axis transverse to the compressor-turbine axis, the drums passing through the bulkhead member and having part thereof located directly between the compressor and combustion apparatus, the combustion apparatus being located directly between the drums and the bulkhead within the drums.

7. A gas turbine engine comprising, in combination, a turbine, a radial-flow compressor driven thereby having an outlet diffuser, the compressor and turbine having a common axis, combustion chambers connected to the turbine to deliver motive fluid thereto, a regenerator comprising two rotary regenerator matrices rotatable about an axis transverse to the turbine axis, the matrices being symmetrically disposed at each side of the turbine axis and the regenerator having approximately the same dimensions transverse to the turbine axis as the compressor diffuser, a housing for the matrices, a bulkhead dividing the housing into a compressor air section connected to the compressor diffuser and an exhaust gas section connected to the turbine exhaust, the combustion chambers being disposed in the compressed air section substantially parallel to the axis of the matrices and extending radially outwardly from the turbine, the regenerator matrices extending through the bulkhead and being disposed directly between the compressor diffuser and the combustion chambers.

8. A gas turbine engine comprising, in combination, a regenerator housing, a bulkhead dividing the interior of the housing into first and second chambers, two coaxial rotary regenerator matrices mounted in the housing passing through the bulkhead, wall means extending from the matrices to the housing, the bulkhead, wall means, and matrices dividing the first chamber into a cool air chamber and a hot air chamber and dividing the second chamber into a hot gas chamber and a cool gas chamber, a combustion apparatus mounted in the hot air chamber, a turbine having an axis perpendicular to the regenerator matrix axis and having an inlet connected to the outlet of the combustion apparatus, the turbine being mounted in the bulkhead and providing a motive fluid path from the combustion apparatus to the hot gas chamber, the combustion apparatus comprising four combustion chambers disposed with their axes parallel to the axis of the regenerator matrices, two combustion chambers being disposed between each matrix and the bulkhead, the outlets of the combustion chambers being at the ends thereof proximate the axis of the turbine inlet, two combustion chamber transition sections connecting the outlets of the combustion chambers to the turbine inlet, each transition section having a semi-annular outlet mounted on the turbine inlet and having two inlets side by side directed away from the turbine inlet axis and receiving the outlets of two of the combustion chambers, a compressor driven by the turbine having an outlet connected to the cool air chamber, and means providing an exhaust outlet from the cool gas chamber.

9. A gas turbine engine comprising, in combination, a regenerator housing, a bulkhead dividing the interior of the housing into first and second chambers, two coaxial rotary regenerator matrices mounted in the housing passing through the bulkhead, wall means extending from the matrices to the housing, the bulkhead, wall means, and matrices dividing the first chamber into a cool air chamber and a hot air chamber and dividing the second chamber into a hot gas chamber and a cool gas chamber, a combustion apparatus mounted in the hot air chamber, a turbine having an axis perpendicular to the regenerator matrix axis and having an inlet connected to the outlet of the combustion apparatus, the turbine being mounted in the bulkhead and providing a motive fluid path from the combustion apparatus to the hot gas chamber, the combustion apparatus comprising two combustion chambers disposed with their axes parallel to the axis of the regenerator matrices, a combustion chamber being disposed between each matrix and the bulkhead, the outlets of the combustion chambers being at the ends thereof proximate the axis of the turbine inlet, two combustion chamber transition sections connecting the outlets of the combustion chambers to the turbine inlet, each transition section having a semi-annular outlet mounted on the turbine inlet and having an inlet directed away from the turbine inlet axis and receiving the outlet of a combustion chamber, a compressor driven by the turbine having an outlet connected to the cool air chamber, and means providing an exhaust outlet from the cool gas chamber.

10. A gas turbine engine comprising, in combination, a housing, a turbine including an annular case providing a gas inlet and an annular gas outlet, a regenerator including two regenerator drums each encircling part of the case and rotatable about an axis substantially intersecting perpendicularly the axis of the turbine case, the drums being disposed equidistantly at each side of the axis of the case and the distance between the drums being substantially less than the diameter of the case, a regenerator bulkhead extending from the turbine case to the housing, the turbine discharging into a space between the bulkhead and the drums, the housing enclosing the regenerator, and an annular retroverted exhaust diffuser connected to the turbine outlet within the said space, the diffuser having an annular outlet directed reversely to the direction of flow through the turbine case and disposed around the turbine case so as to decelerate and distribute the gas flow from the turbine and divert the flow from a direct path from the turbine outlet to the regenerator drums.

11. A gas turbine engine as recited in claim 10 in which the diffuser comprises recurved bounding walls and a plurality of radially spaced coaxial recurved annular sheets disposed between the walls.

References Cited in the file of this patent

UNITED STATES PATENTS

| | | |
|---|---|---|
| 2,459,079 | Johnson | Jan. 11, 1949 |
| 2,667,034 | Alcock | Jan. 26, 1954 |
| 2,795,928 | Huebner et al. | June 18, 1957 |

FOREIGN PATENTS

| | | |
|---|---|---|
| H21,432 Ia/46F | Germany | Dec. 29, 1955 |